J. H. DOAK.
AUTOMOBILE HUB WINDLASS.
APPLICATION FILED NOV. 13, 1920.
1,413,523.
Patented Apr. 18, 1922.
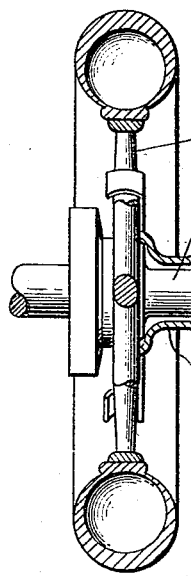
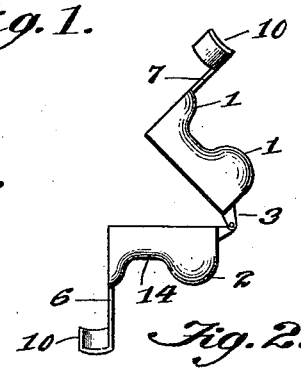
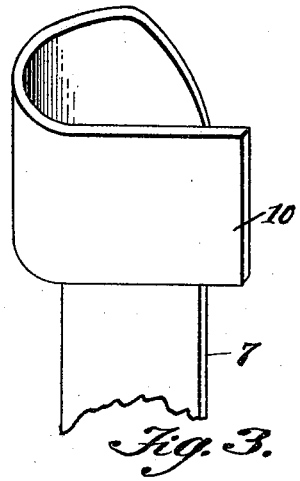
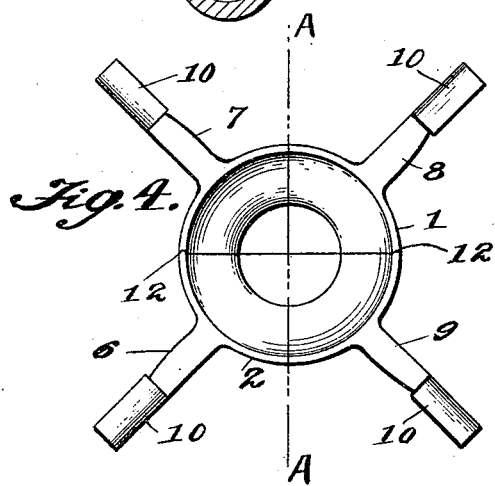
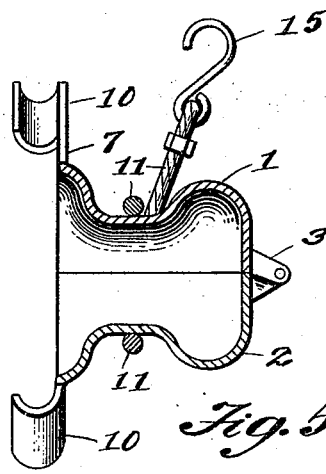
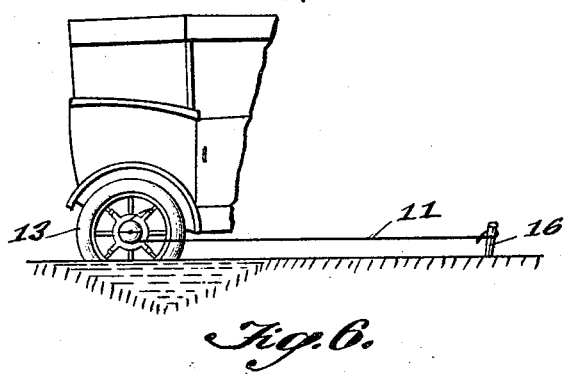
John H. Doak
Inventor.
By Lloyd Garrison
Attorney

UNITED STATES PATENT OFFICE.

JOHN H. DOAK, OF BOISE, IDAHO.

AUTOMOBILE HUB WINDLASS.

1,413,523. Specification of Letters Patent. Patented Apr. 18, 1922.

Application filed November 13, 1920. Serial No. 423,946.

*To all whom it may concern:*

Be it known that I, JOHN H. DOAK, a citizen of the United States, residing at Boise, in the county of Ada and State of Idaho, have invented new and useful Improvements in Automobile Hub Windlasses, of which the following is a specification.

My invention relates to that class of inventions for pulling an automobile or other self propelling vehicle out of mud or other obstruction from which it is unable to extricate itself through inability to obtain traction because of slippage of the wheels. The device herein described is intended to be placed on the hub of the automobile and by pulling on a rope attached to some distant object allow the automobile to pull itself out by its own power.

In the accompanying drawings Fig. 1 illustrates the method of attaching the device to the wheel of an automobile.

Fig. 2 shows the device partially opened up for insertion in place on the hub.

Fig. 3 is a perspective view of the hook which engages the spokes of the wheel.

Fig. 4 is a view of the end of the device which rests against the wheel.

Fig. 5 is section A—A of Fig. 4.

Fig. 6 is a diagrammatic illustration of the method of using the device.

My invention consists essentially of two similar cast iron parts 1 and 2 held together by hinge 3. The two parts close and form a cup shaped spool which fits over the hub 4 of the automobile wheel 5 and has the radial arms 6, 7, 8, and 9 which engage spokes of the wheel through medium of hook 10, cast as an integral part of each arm. The two halves are held rigidly together by the tension of rope 11 and to prevent slippage with reference to each other, which would cause breakage, the small corrugation 12 is provided.

In using the device it is placed on the hub of the drive wheel 13, rope 11 is given one turn around the closed spool in groove 14, and hook 15 is attached to one of the spokes. The rope is then drawn tight and attached to peg 16 or other solid external object, and the engine started. The rope is wound around the spool by the rotation of the wheel and in so doing pulls the automobile towards the peg to solid ground.

The device as herein shown is in the form in which I prefer to construct it, but it is understood that variations may be made in the form of the spool, the number of radial arms, and in other details within the spirit of the invention.

What I claim as my invention is:

1. A device of the type described comprising two parts adapted to enclose the hub of an automobile wheel, a hinge joining said parts, radial arms projecting from the circumference of the device on the end opposite the hinge, hooks on the ends of said arms to engage the spokes of the wheel in one direction of rotation, corrugations on the bearing surface between the two parts, a groove in the circumference of the device, a rope adapted to be wound around the device in the groove and to hold the two parts together, and a suitable means of fastening the rope to a spoke of the wheel.

2. A grooved spool composed of two parts, a hinge joining the two parts at one end, radial arms projecting from the circumference of the spool at the opposite end, hooks on the ends of the radial arms to engage the spokes of an automobile wheel in one direction of rotation, corrugations on the bearing surface between the two parts, a rope adapted to be wound in the groove of the spool in such manner as to hold the two parts together, a hook on one end of the rope to engage a spoke of the wheel.

In witness whereof I have set my hand in the presence of witnesses.

JOHN H. DOAK.

Witnesses:
J. E. SEARLES,
A. S. ALMY.